Oct. 10, 1933.  W. J. KUNTZ  1,929,591
TREATING OF LIME
Filed Sept. 26, 1931   3 Sheets-Sheet 1

INVENTOR
William J. Kuntz
by Byrnes, Stebbins, Parmelee & Blenko
His Attys.

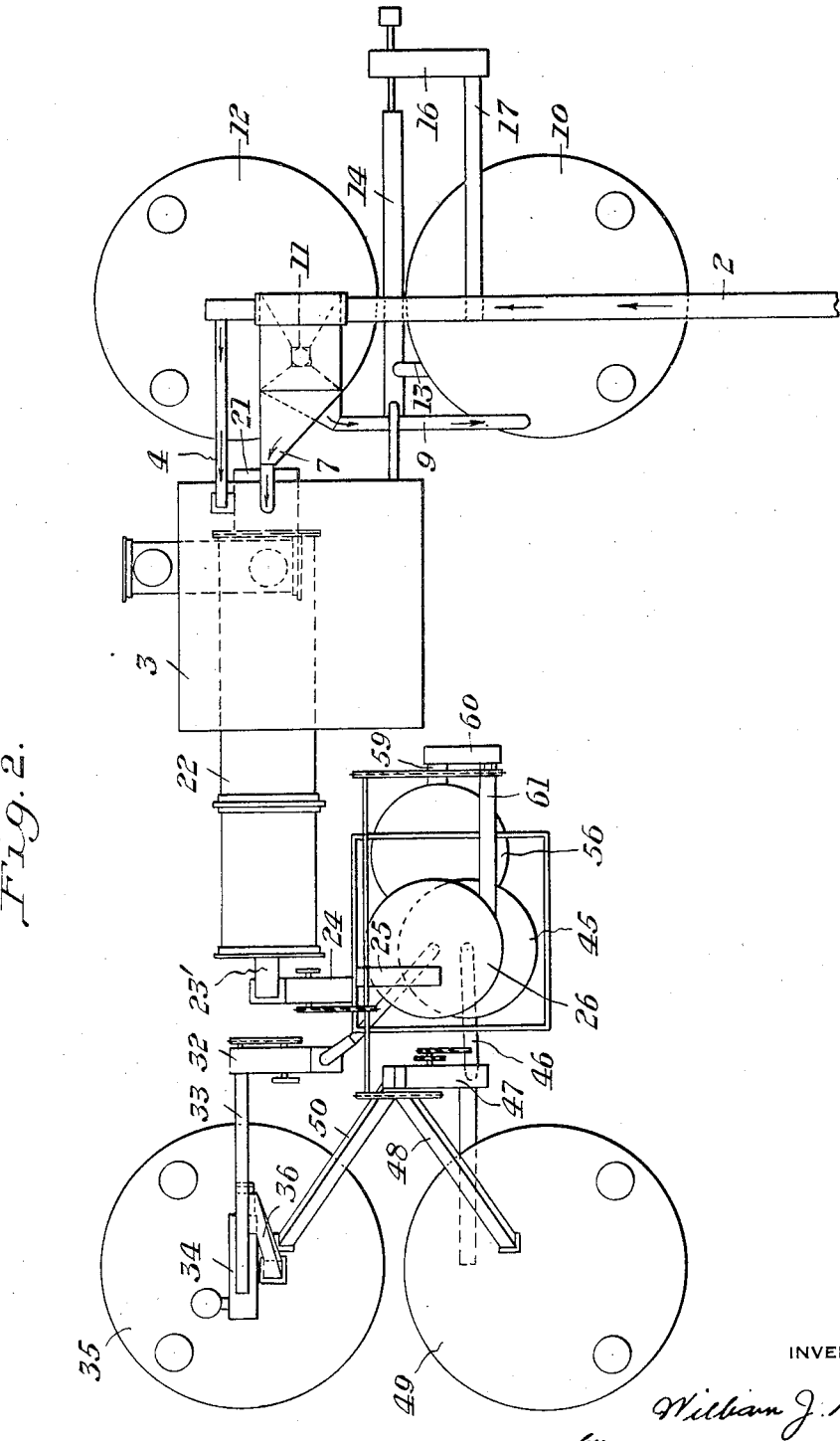

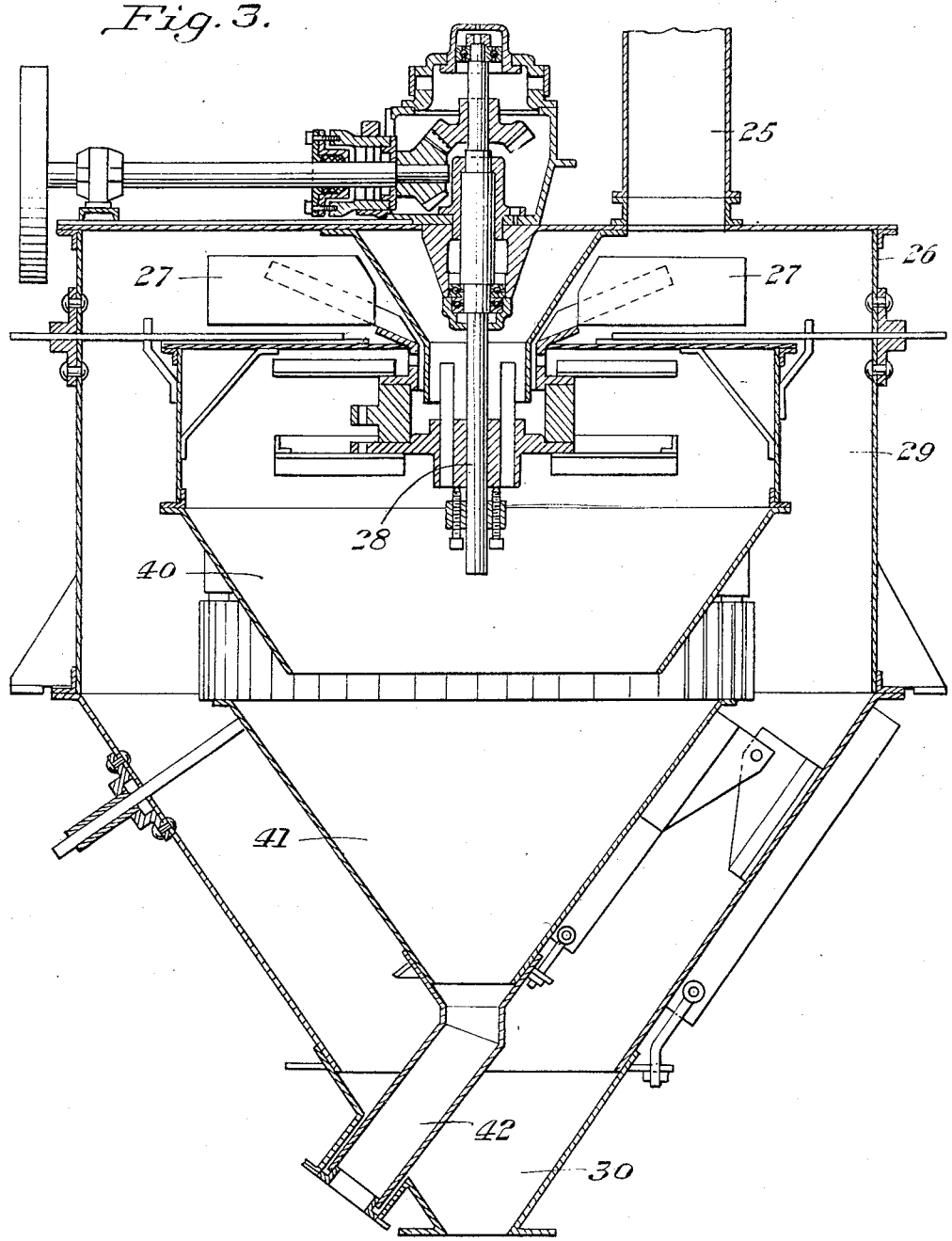

Patented Oct. 10, 1933

1,929,591

UNITED STATES PATENT OFFICE 1,929,591

TREATING OF LIME

William J. Kuntz, Aspinwall, Pa.

Application September 26, 1931
Serial No. 565,343

4 Claims. (Cl. 23—287)

My invention relates generally to the treating of lime and, more particularly, to the classification of the lime both before and after hydration, and to the combining of the classification of the lime and calcium hydroxide with the hydrating process in such manner that various grades of unhydrated and hydrated lime can be obtained from a single compact plant.

There is a demand for burned lime which has not been hydrated, as well as for hydrated lime. For the unhydrated lime there is a demand for more than one grade, including finely divided lime, a coarser grade called "pebble lime", and a still coarser grade called "lump lime".

The unhydrated lime deteriorates when in contact with the air, both by the absorption of moisture from the air and by the absorption of carbonic acid gas from the air. When carbonic acid gas is absorbed, the lime becomes unsuitable for many commercial purposes, having returned in part, at least, to the chemical state of natural lime before burning. Lime which has not been hydrated must be protected from the atmosphere to prevent it from absorbing moisture and carbonic acid gas, and must be shipped in air-tight receptacles.

The hydrated lime can be shipped in containers which are not air-tight, without there being deterioration of the lime, as it does not readily absorb moisture from the air in such a state, or pick up carbonic acid gas. For this reason, it is very desirable to hydrate the lime before shipment. There is a market demand for several different grades of the hydrated lime.

My invention relates to the classification of lime into grades, so that the demands of the market can be supplied from one manufacturing establishment. My invention covers the classification of the burned lime into various marketable grades, the hydration of the lump lime and the classification of the hydrated lime into marketable grades.

In the accompanying drawings I have shown for purposes of illustration only, a preferred embodiment of my invention.

In the drawings,

Figure 2 is a plan view of the apparatus shown in Figure 1; and

Figure 3 is a vertical section of the combined centrifugal separator and aerating device.

Figure 1:
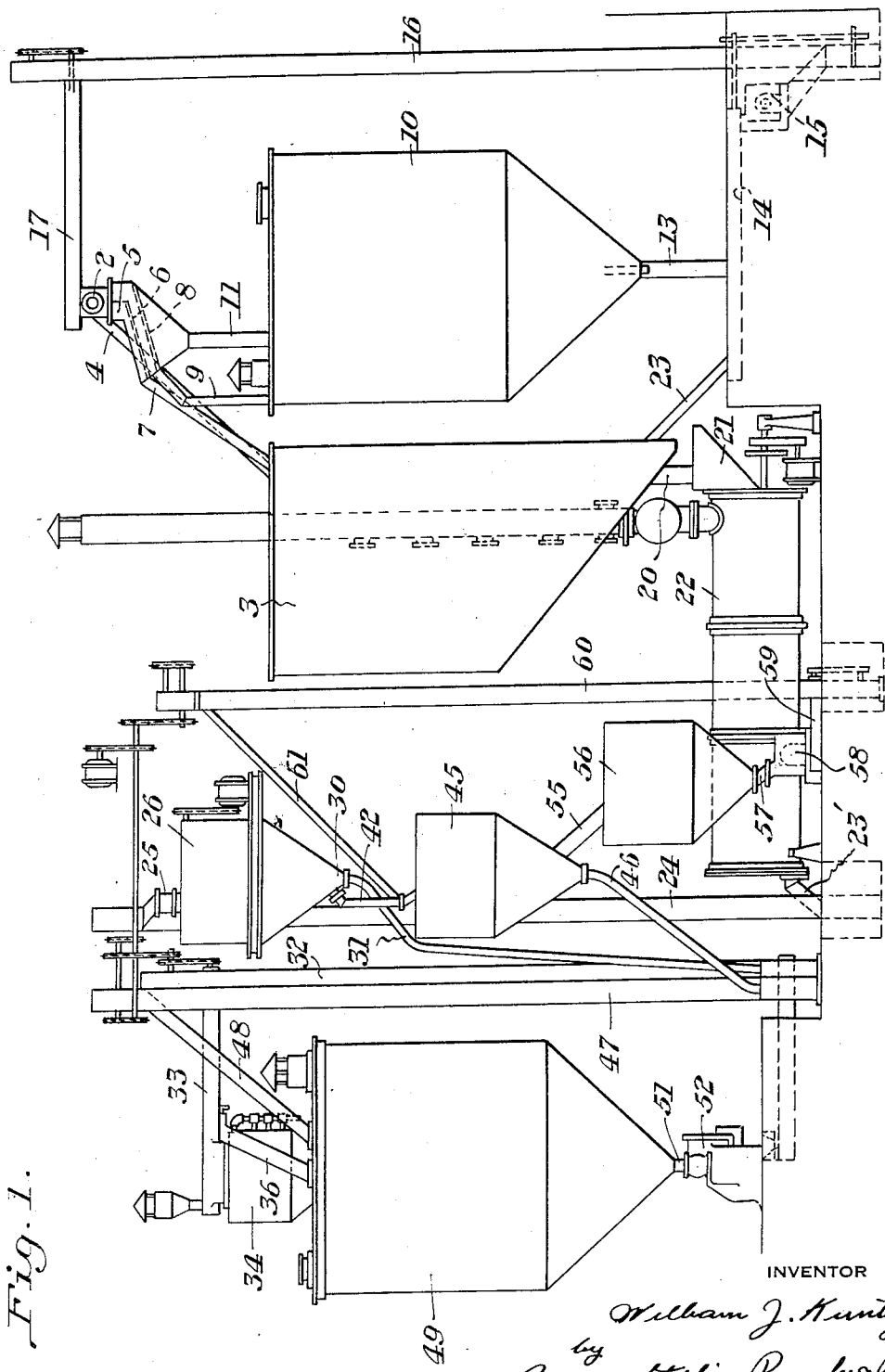
Figure 1 is a side elevation of the apparatus which I provide for treating lime, shown more or less diagrammatically.

The lime to be treated as it comes from the kilns, or from crushers after being taken from the kilns, is delivered to the apparatus shown in the drawings by the screw conveyor 2. If there is no demand for unhydrated lime, the lime may be delivered by the screw conveyor 2 directly to the hydrator feed bin 3 by means of the pipe 4. If unhydrated lime is desired, however, the apparatus shown in the drawings may be used for obtaining two grades thereof. The lime being carried to the apparatus shown by means of the conveyor 2 may be passed downwardly through pipe 5 onto a hummer screen 6. The hummer screen 6 will separate out the coarser grades, and these coarser grades will be carried by the pipe 7 to the hydrator feed bin.

The lighter particles will pass through the hummer screen 6 onto the hummer screen 8. This hummer screen will further separate out the lighter and heavier particles, and the heavier particles will pass from the hummer screen through the pipe 9 to the storage bin 10. The finer grade of lime or "ground lime" will pass through the hummer screen 8 and will be carried through the pipe 11 to the storage bin 12.

Provision is made for withdrawing the pebble lime in the bin 10 and for returning it to the conveyor 2, so that if it is desired, the pebble lime may be sent to the hydrator feed bin 3 and subsequently converted into hydrated lime. A pipe 13 connects with the bottom of the storage bin 10 and also with a conveyor 14, on which lime from the bin 10 is deposited when it is desired to carry the material back to the conveyor. The lime may be transported by the conveyor 14 to a crusher 15, which further pulverizes the material. The crusher deposits the lime which passes therethrough on an elevator 16, which carries the material up to a conveyor 17, which carries the material to the conveyor 2.

As stated above, the lime can be transported by the conveyor 2 to the hummer screens or directly to the hydrator feed bin. If it is not desired to further pulverize the pebble lime taken from the bin 10, the conveyor 14 may be arranged to transport the lime past the crusher directly to the elevator 16.

The lower end of the hydrator feed bin 3 is provided with a rotary feeder 20, which communicates with the hopper 21 of the hydrator 22. A chute 23 communicates with the conveyor 14 so that materials from the bin 3 may be conducted through the crusher 15 for further removing finely divided particles from the coarse materials, before the materials are again placed on the hummer screens, if desired.

After hydration the calcium hydroxide is discharged from the hydrator through a conduit 23' to an elevator 24. The calcium hydroxide is then deposited by the elevator in a conduit 25 and carried thereby to a separator 26. As shown more particularly in Figure 3, the calcium hydroxide is discharged upon the blades 27, which are revolved by means of a shaft 28, and the revolving blades not only act as a centrifugal separator for the incoming stream of the hydrate, but draw in air which is thoroughly mixed with the hydrate for removing the moisture content from the hydrate. The fine particles of calcium hydroxide are thrown outwardly and pass downwardly through the annular section 29 of the top portion of the separator and are discharged through the lower conically shaped end 30. These fine particles are conducted by a pipe 31 to an elevator 32 which carries the particles to a conveyor 33. The conveyor 33 carries the particles through a dryer 34 to the storage bin 35, or direct to the storage bin 35 through a chute 36 without passing through the dryer 34.

The heavier particles pass downwardly through the central chamber 40 and are deposited in the conically shaped hopper 41. They are then carried from the conically shaped hopper by means of the discharge pipe 42.

The heavier particles are conducted by the pipe 42 into the top of a secondary separator and aerator 45. This separator is of similar construction to that above described and is so constructed as to cause the further separation of the calcium hydroxide. In this separator the particles are also treated with air in the manner described above with respect to material passing through the separator 26. The finer particles passing into the separator 45 will be thrown outwardly in the manner above described, and pass downwardly through the separator. They are then conducted by the pipe 46 to an elevator 47, by which they are carried to an elevated point. From here they are carried by a conduit 48 to a second hydrate storage bin 49. A conduit 50 is also provided so that the material may be carried to the hydrate storage bin 35 with the more finely divided grade of calcium hydroxide. The lower ends of the bins 35 and 49 are provided with the usual discharge members 51, each of which is equipped with a device 52 for supplying material to bags in predetermined quantities.

The heavier particles passing through the separator 45 are conducted by means of a conduit 55 to a tailings bin 56 or direct to a beater mill 58. The particles which enter the tailings bin 56 consist of coarse unburned lime and foreign matter which is covered with fine particles of the hydrated lime. It is very desirable that the finely divided hydrated lime be removed from the coarse, unburned lime and foreign matter. This material is accordingly passed by means of a conduit 57 to a beater mill 58, which is described and claimed in my Patent No. 1,742,511. The beater mill violently agitates the materials and removes the finely divided particles of calcium hydroxide from the undesirable material. These finely divided particles are deposited by the beater mill on the conveyor 59 which carries the material to an elevator 60, which deposits the material in a conduit 61, which is connected with the pipe 42, which leads to the auxiliary separator 45. These particles are then again passed through the auxiliary separator and separated in the manner above described. The undesirable material is ejected from the beater mill 58 and thrown away.

As may be seen from the above description, I provide for the classification of the unhydrated lime and for the classification of the hydrated lime, all of which classification is conducted in combination with the hydration of the lime, so as to obtain a compact plant from which all the demands of the trade can be satisfied.

While I have shown and described a preferred embodiment of my invention, it will be understood that I do not intend to be bound thereby, but that the same may be otherwise embodied or practiced within the scope of the following claims:

I claim:

1. Apparatus for treating lime comprising a hydrator for hydrating the lime to form calcium hydroxide, a separator for separating the calcium hydroxide into lighter and heavier particles and for passing a drying fluid through the particles at the same time, means for conveying the lighter particles to a point of delivery, a second separator to which the heavier particles are passed for further separating the heavier particles into lighter and heavier particles and for passing a drying fluid through the particles at the same time, means for conveying the second mentioned lighter particles to a point of delivery, a beater mill for working over the heavier particles, means for transporting said worked material to one of said separators for separating the worked material into lighter and heavier particles and for passing a drying fluid through the particles at the same time, the lighter particles being then conveyed to a point of delivery by the aforesaid means to a storage bin.

2. In a plant for treating lime, the combination of a hydrator for hydrating the lime to form calcium hydroxide, a separator for separating the calcium hydroxide into lighter and heavier particles, a storage bin, means for transporting the lighter particles to the bin, a second separator to which the aforesaid heavier particles are passed for further separation into lighter and heavier particles, means for transporting the last mentioned lighter particles to a storage bin, a beater mill for reworking the last-mentioned heavier particles, and means for returning a part of the reworked material to one of said separators for further separation into lighter and heavier particles, the lighter particles being then transported by the aforesaid means to a storage bin.

3. In a plant for treating lime, the combination of a hydrator for hydrating the lime to form calcium hydroxide, a separator for separating the calcium hydroxide into lighter and heavier particles, a storage bin, means for transporting the lighter particles to the bin, a second separator to which the aforesaid heavier particles are passed for further separation into lighter and heavier particles, a second storage bin, means for transporting the last-mentioned lighter particles to said second storage bin, a beater mill for reworking the last-mentioned heavier particles, and means for returning a part of the reworked material to one of said separators for further separation into lighter and heavier particles, the lighter particles being then transported by one of the aforesaid means to a storage bin.

4. In a plant for treating lime, the combination of apparatus for classifying the lime into grades, a storage bin to which the heavier particles are transported, a hydrator for hydrating the heavier particles to form calcium hydroxide, means for passing the heavier particles from said bin to said hydrator, a separator for separating the calcium hydroxide into lighter and heavier particles, means for transporting the calcium hydroxide from said hydrator to said separator, a storage bin, means for transporting the lighter particles to the bin, a second separator to which the aforesaid heavier particles are passed for further separation into lighter and heavier particles, means for transporting the last-mentioned lighter particles to a storage bin, a beater mill for reworking the last-mentioned heavier particles, and means for returning a part of the reworked material to one of said separators for further separation into lighter and heavier paticles, the lighter particles being then transported by the aforesaid means to a storage bin.

WILLIAM J. KUNTZ.